Dec. 6, 1966  D. R. FERRIS  3,289,780
THREE-WHEELED VEHICLE DRIVEN BY ELECTRIC MOTOR
Filed March 3, 1965  6 Sheets-Sheet 1
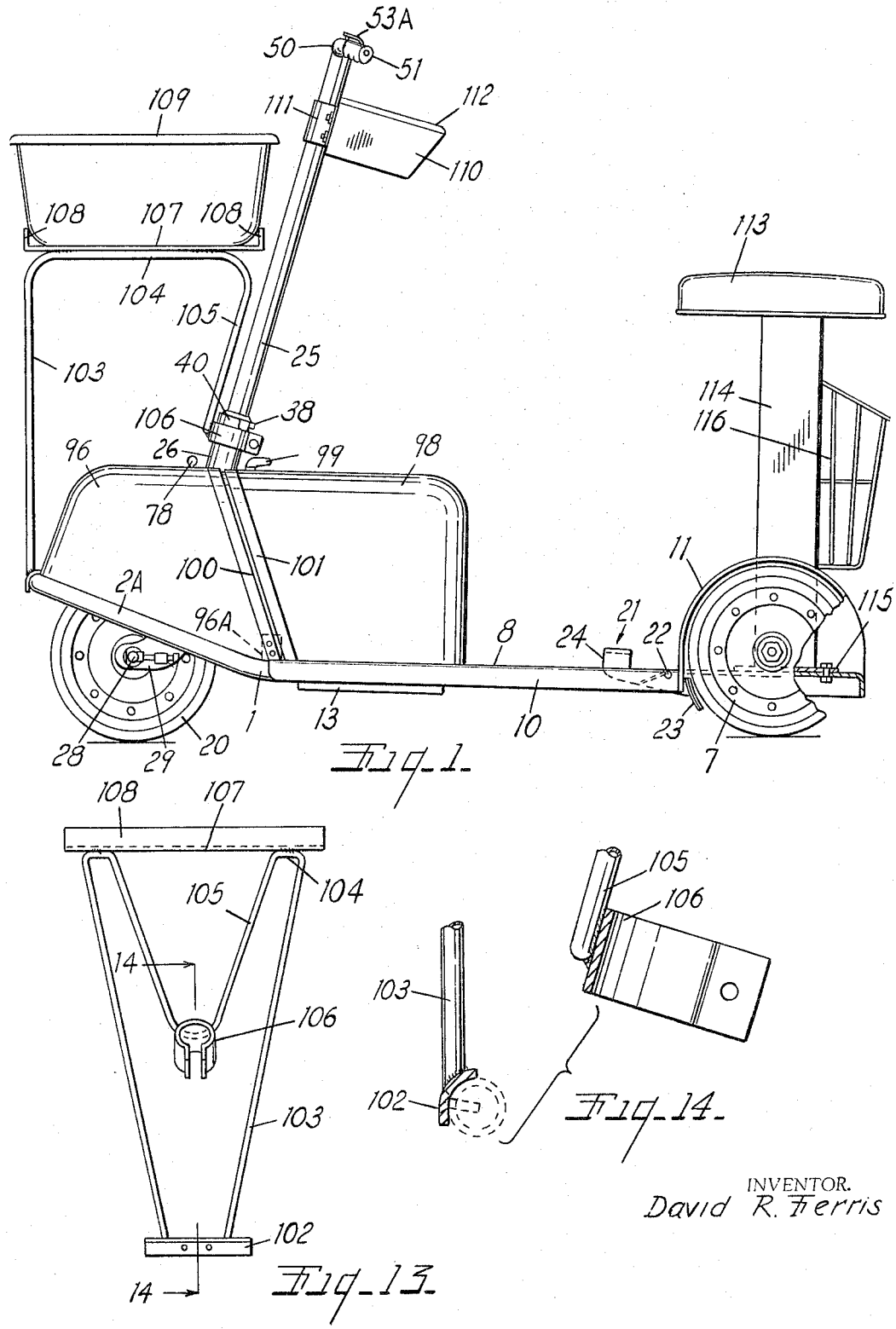
INVENTOR.
David R. Ferris

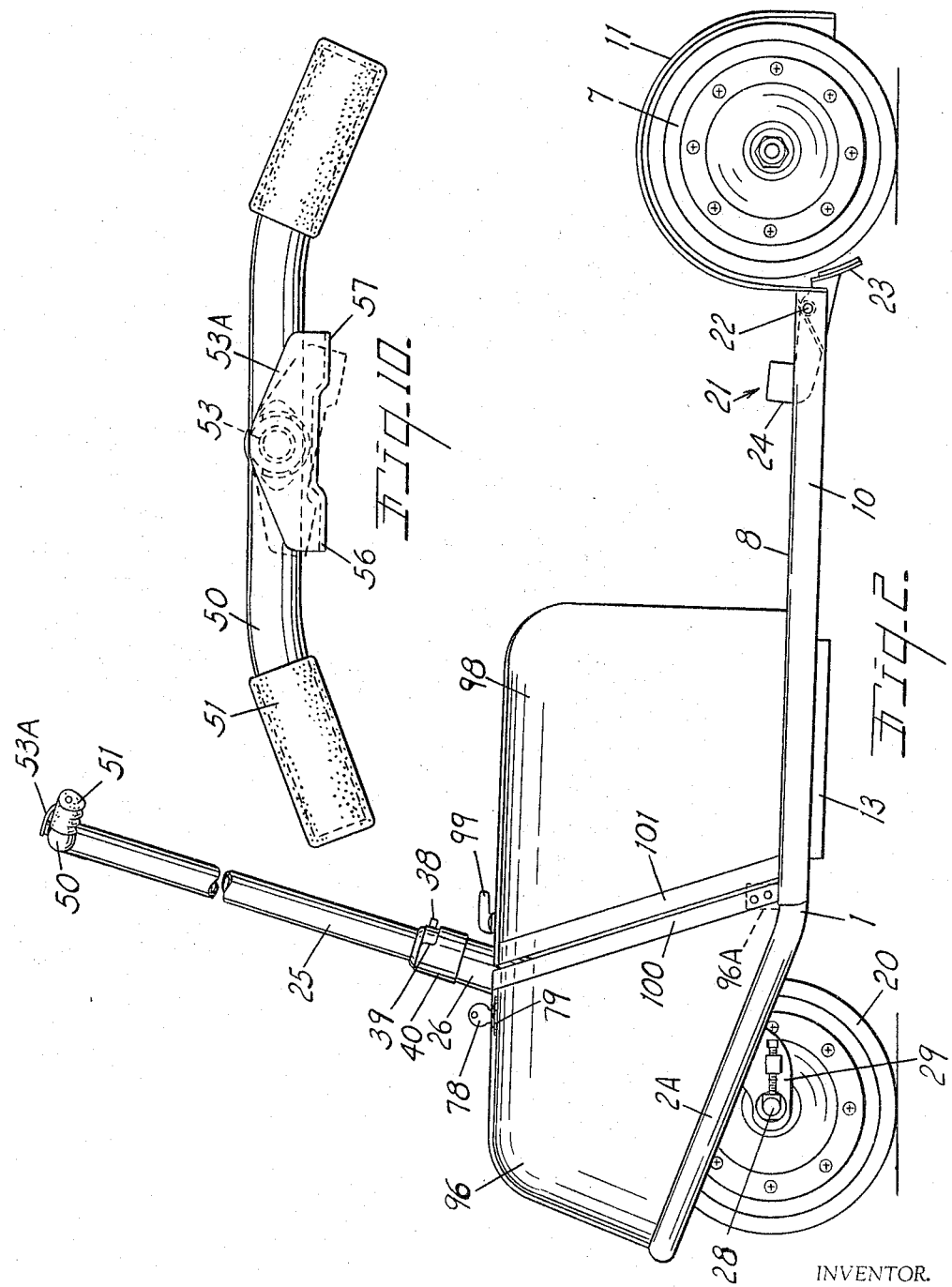

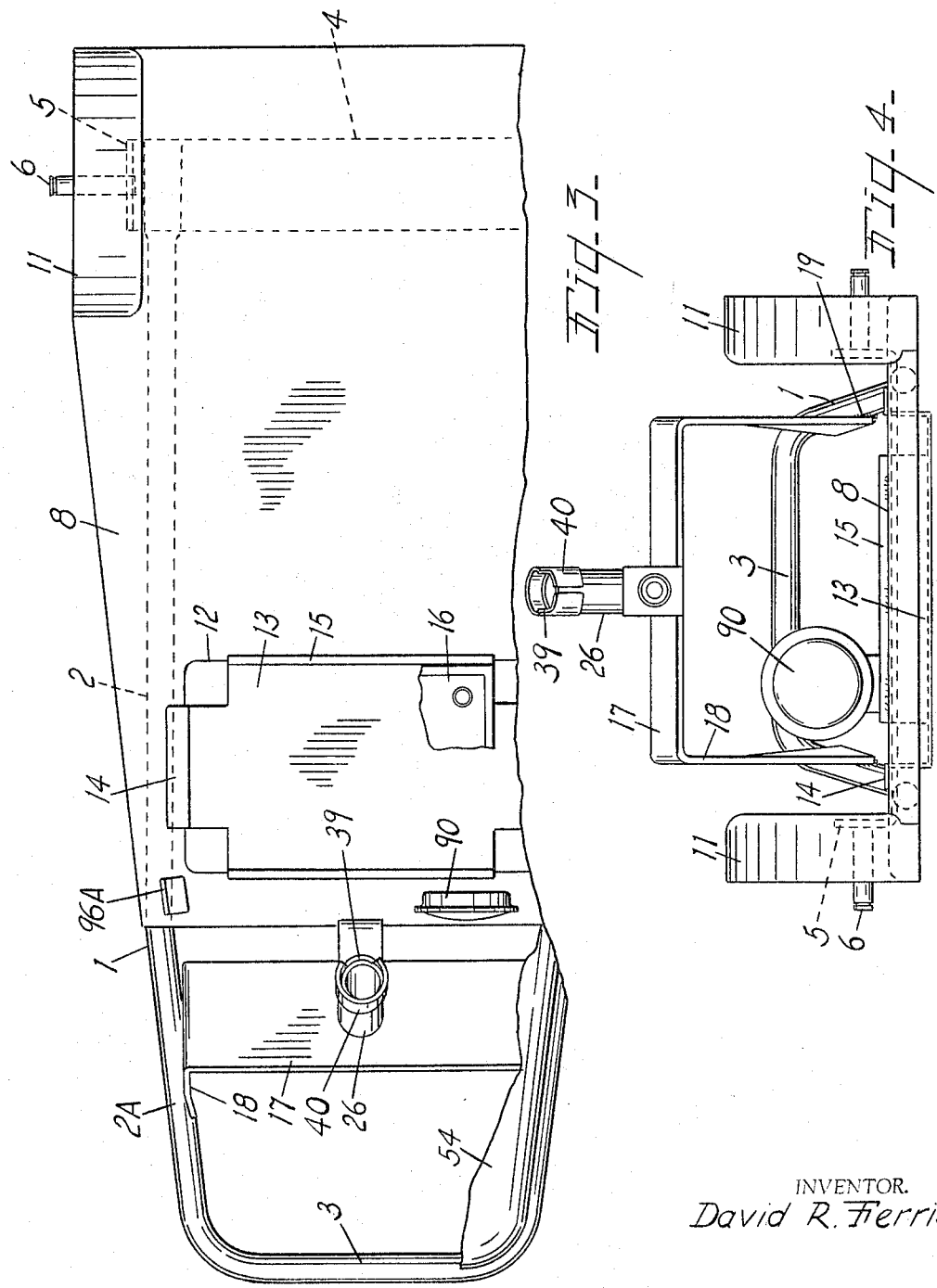

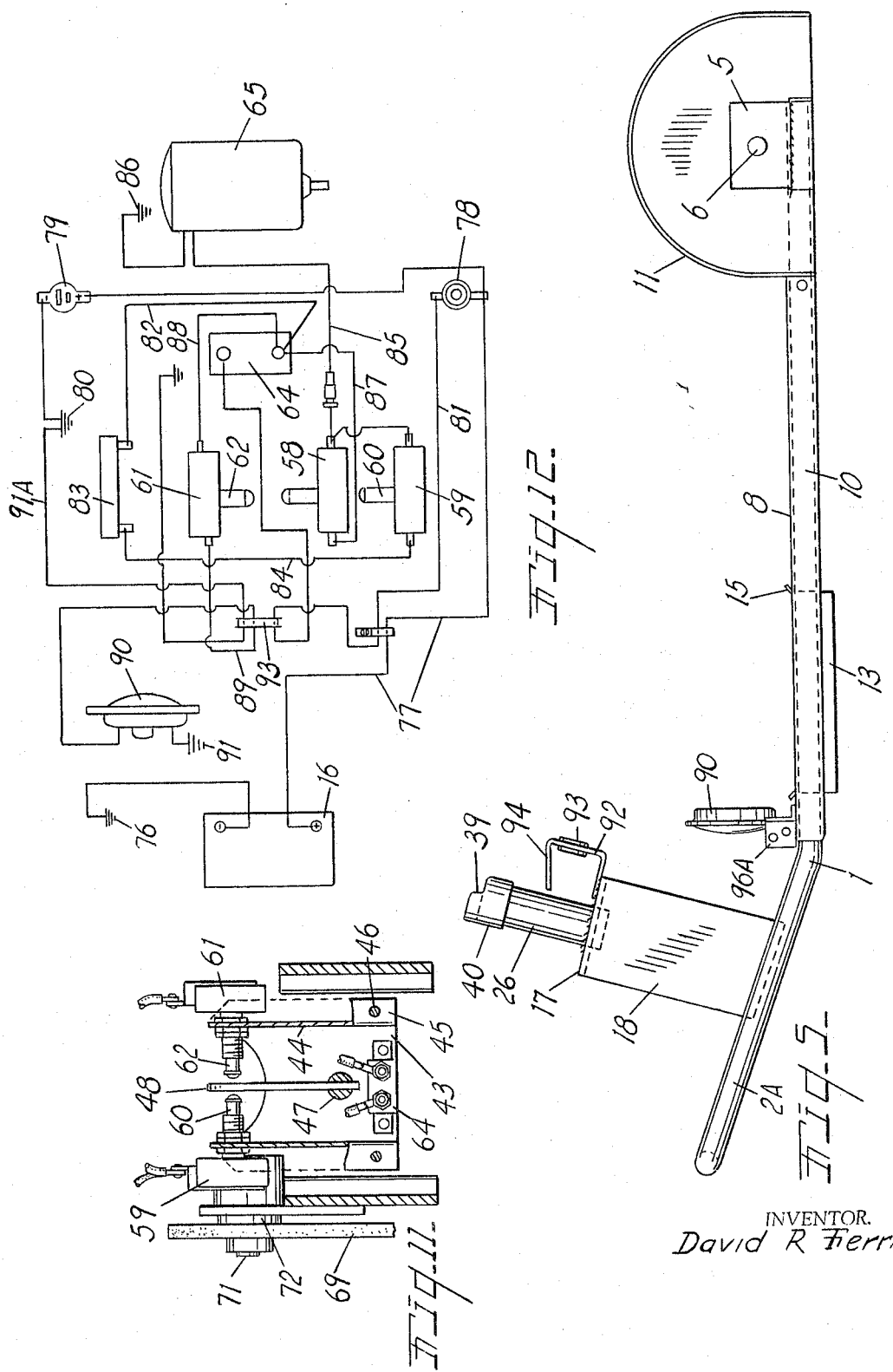

Dec. 6, 1966 D. R. FERRIS 3,289,780
THREE-WHEELED VEHICLE DRIVEN BY ELECTRIC MOTOR
Filed March 3, 1965 6 Sheets-Sheet 5
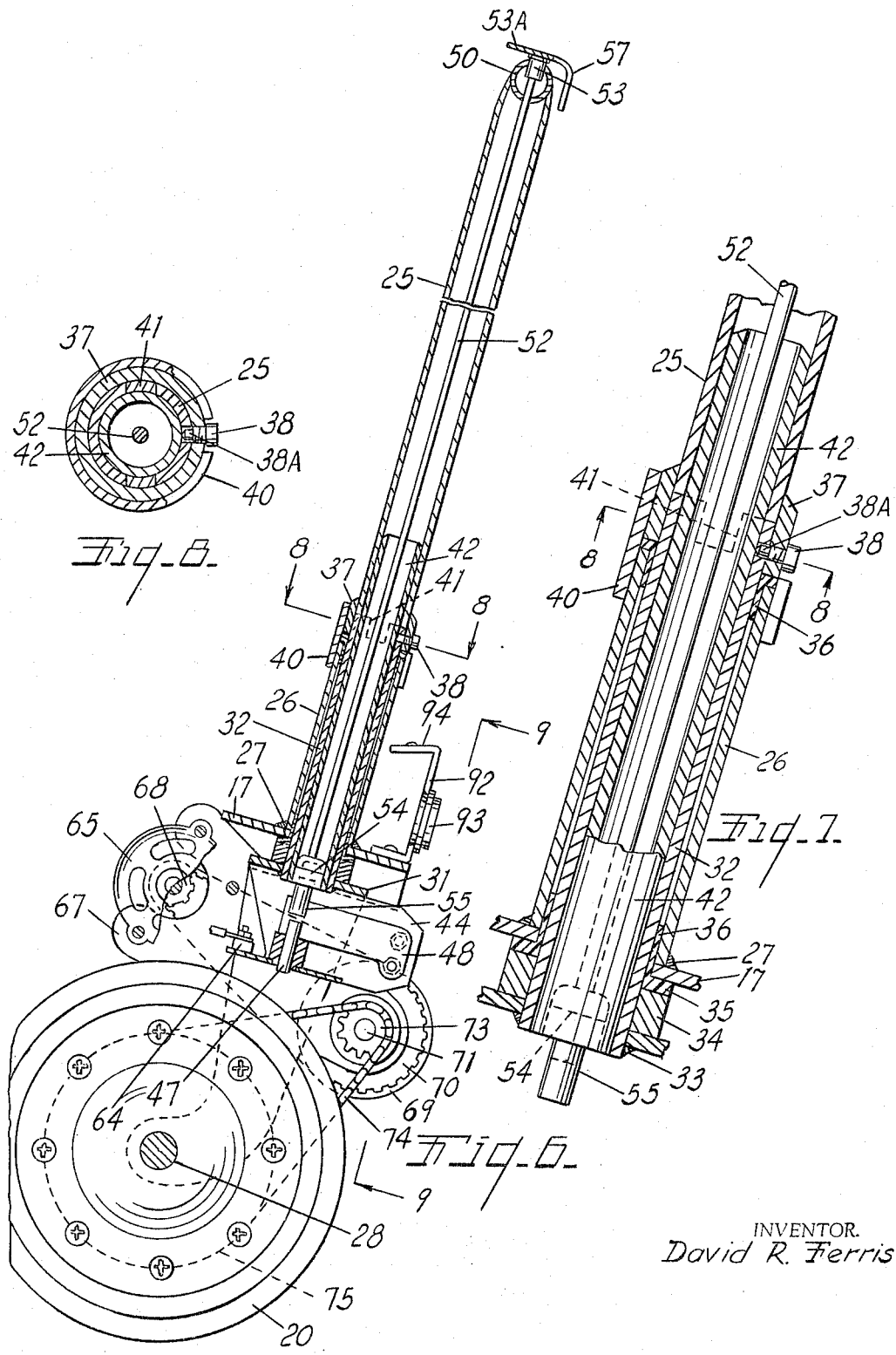
INVENTOR.
David R. Ferris Dec. 6, 1966 D. R. FERRIS 3,289,780
THREE-WHEELED VEHICLE DRIVEN BY ELECTRIC MOTOR
Filed March 3, 1965 6 Sheets-Sheet 6

INVENTOR.
David R. Ferris

United States Patent Office 3,289,780
Patented Dec. 6, 1966

3,289,780
THREE-WHEELED VEHICLE DRIVEN BY ELECTRIC MOTOR
David R. Ferris, Cadillac, Mich., assignor to Kysor Industrial Corporation, Cadillac, Mich.
Filed Mar. 3, 1965, Ser. No. 436,781
9 Claims. (Cl. 180—26)

This invention relates to improvements in motor vehicle for single person use. The principal objects of this invention are:

First, to provide a motor vehicle for use in conveying the operator thereof in offices, factories, warehouses, and the like, which is easily controllable by the operator for turning, speed variation and the sounding of warning signals.

Second, to provide a motor vehicle which may be operated by a user, standing upon a platform or seated, from an upright control column and handle bar, the column being removable from the platform or body of the vehicle for shipping but easily assembled in operative relation to the controls on the body.

Third, to provide a vehicle having these advantages in which the driving and steering wheel, the motor, gearing, the battery and the control means are supportedly mounted on the frame structure and are provided with a protecting and guard housing which is readily removable to afford access to the housed parts, but provides effective guard therefor, the frame constituting a bumper for protecting both the housing and the enclosed parts.

Fourth, to provide a motor vehicle having electrical control switches and wiring permanently mounted in the body with switch operating structure mechanically engageable by removable mechanical controls.

Fifth, to provide a structure having these advantages which may include receptacle or article supporting devices positioned so that the contents may be removed by the operator in operating position on the vehicle.

Objects relating to details and economies of the invention will appear from the description to follow. The invention is defined and pointed out in the claims.

A preferred embodiment of the invention is illustrated in the accompanying drawing, in which:

FIGURE 1 is a side view of one embodiment of the invention with a portion at the rear of the vehicle broken away and with parts shown in vertical section to illustrate structural details of the rear seat and the mounting thereof.

FIG. 2 is a side view of the embodiment of the invention illustrated in FIG. 1 with the seat and receptacle supports illustrated in FIG. 1 omitted.

FIG. 3 is a fragmentary plan view of the frame and platform and some of the supporting parts or elements mounted thereon, portions of the frame being shown by dotted lines.

FIG. 4 is a rear elevational view of the body unit and supporting parts illustrated in FIG. 3.

FIG. 5 is a side elevational view of the frame and part supporting elements mounted thereon as is illustrated in FIGS. 3, 4 and 5.

FIG. 6 is an enlarged fragmentary view in vertical section, showing details of the driving, steering and control means, the frame being omitted.

FIG. 7 is an enlarged fragmentary view mainly in section corresponding to that of FIG. 6 further illustrating details of the parts illustrated in FIG. 6.

FIG. 8 is mainly a cross sectional view on a line corresponding to lines 8—8 of FIGS. 6 and 7.

FIG. 10 is a top view of the steering handle and switch control means, the switch control means being shown in one position by full lines and in another position by dotted lines.

FIG. 11 is a fragmentary view in horizontal section along the plane of the line 11—11 in FIG. 9 illustrating further details of the control means.

FIG. 12 is a schematic wiring diagram illustrating the associated relation of the control means and also the locking switch and connections to a charging means, these several parts being illustrated conventionally.

FIG. 13 is a rear elevational view of the article supporting bracket which is mounted on the front of the vehicle as is illustrated in FIG. 1.

FIG. 14 is a fragmentary view illustrating the details of the mounting means for the supporting bracket as shown in FIG. 1.

Figure 9:
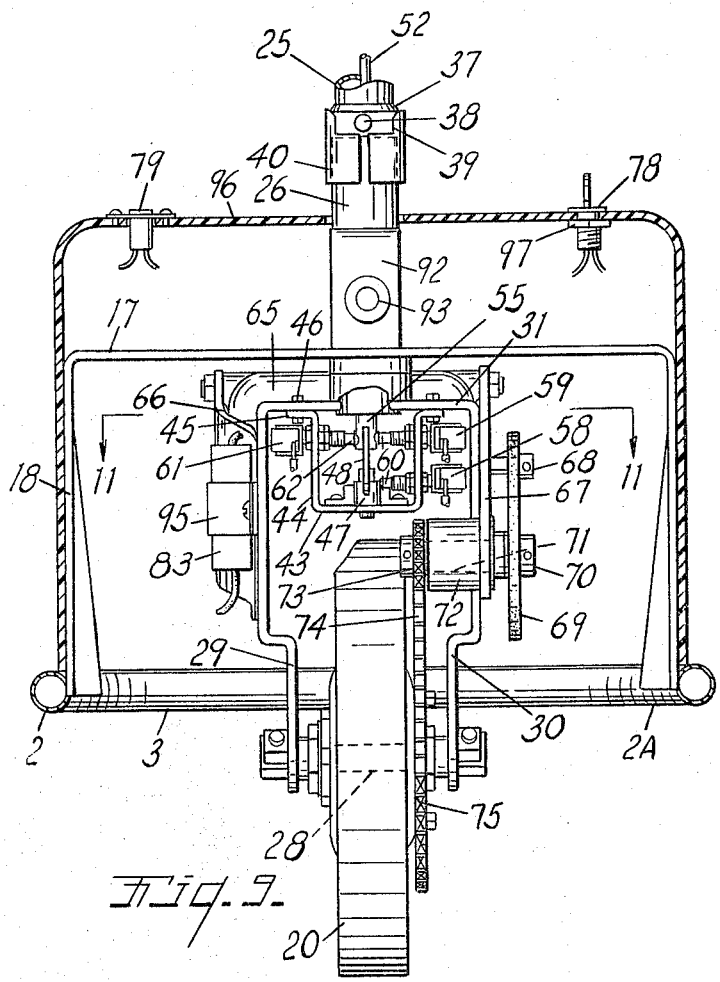
FIG. 9 is an enlarged fragmentary view on a line corresponding to line 9—9 of FIG. 6 including portions of the frame and illustrating further details of the driving and control means.

It should be understood that the structure illustrated in FIG. 2, which does not have the user's seat and the receptacle holders and receptacles illustrated in FIG. 1, is perhaps the main commercial embodiment. However, the seat and receptacle holder are desirable and may be added to the embodiment illustrated in FIG. 2 without substantial cost other than the matter of the parts.

Attention is directed to the Weigel and Ferris Patent 3,099,326, issued July 30, 1963, of which this invention is an improvement as to structural and manipulatable features.

The main body frame 1 is desirably formed of tubular stock and comprises the side members 2 disposed in parallel relation and having upwardly inclined portions 2A at their front ends connected by the crosspiece 3. These side members 2 are connected at their rear ends by the cross bar 4 which has upwardly projecting portions 5 at its ends to which the wheel journals or spindles 6 are secured. The rear wheels 7 are desirably provided with rubber tires. The platform 8 is desirably formed of sheet stock and has portions projecting laterally from the frame side members 2 and preferably having downwardly turned flanges 10 on their outer edges. The rear wheel housings 11 are fixedly mounted on the rear end of the platform to project upwardly therefrom and serve as guards for the rear wheels 7. The platform terminates at the rear ends of the upwardly inclined portions of the frame side members.

The platform is fixedly secured to the frame and to the rear cross member 4. The details of the securing means are not illustrated, but when the parts are formed of metal they are desirably connected by spot welding. The platform serves as a brace or strut for the frame side members. When the seat is included, as in FIG. 1, and is in use the weight of the user is largely on the rear wheels.

In the embodiment illustrated, the platform 8 is provided with a rectangular opening 12 adapted to receive the battery support 13 which has upwardly and outwardly projecting portions 14 on its ends overlapping the platform at the ends of the opening, and longitudinal flanges 15 overlapping the platform at the front and rear of the opening. A fragment of the battery 16 is indicated in FIGURE 3. It is protected by a housing, as will be hereinafter pointed out. Intermediate of the inclined front 2A, the frame is provided with a transverse, inverted U-shaped bracket-like portion of flat metal stock which constitutes a part of the frame and in the embodiment illustrated has a cross to top portion 17 and downwardly projecting arms 18 which are fixedly secured at 19 to the upwardly inclined front end portions 2A of the side members 2, see FIGS. 3, 4 and 5. This bracket member constitutes a part of the frame and a supporting and connecting means for the drive wheel 20, as will be hereinafter point out.

In the embodiment of my invention illustrated, I provide a foot actuated brake designated generally by the numeral 21, disposed on the inner side of and pivotally mounted at 22 on one of the downwardly projecting flanges 10 of the platform, see FIGS. 1 and 2. The brake is provided with a wheel engaging member 23 and has a portion 24 projecting upwardly through the deck or platform to be engaged by the foot of the operator when the operator is seated or is standing on the platform.

The steering shaft or column 25 is removably mounted for limited rotative movement in the bearing sleeve member 26 which is centrally disposed and fixedly mounted on the top cross portion 17 of the frame bracket member by welding as at 27.

The drive wheel 20, which is steerable, is mounted on an axle 28 carried by the arms 29 and 30 of a yoke having a top cross piece 31. Secured to the center of the yoke cross piece 31 in perpendicular relation to the cross piece is a tubular spindle 32. The spindle may be secured to the yoke as by welding at 33. The spindle projects upwardly into the bearing sleeve 26 through an annular spacer 34 with a thrust bearing ring of nylon 35 interposed between the ring 34 and the underside of the cross piece 17. Bushings 36 between the spindle 32 and the sleeve 26 provide antifriction rotational alinement between the parts. A retaining collar 37 positioned around the upper end of the spindle and retained in place by the screw 38 which has an inner end 38A passed through a hole in the spindle to hold the spindle axially in the sleeve. The head of the screw is located in an arcuate cut-out 39 in the rear side of a fixed collar 40 secured around the upper end of the sleeve. The head of the screw thus limits turning motion of the spindle and the yoke and wheel 20 carried thereby.

The lower end of the steering column 25 and the upper end of the spindle 32 have mating axial tongues and notches 41 that abut axially within the retaining collar 37 to transmit rotary steering force therebetween. An extension tube 42 secured within the lower end of the steering column projects to the lower end of the spindle to assist in holding the column and spindle alined and to act as a guide for the control rod to be described.

Secured to the under side of the cross piece 31 of the drive wheel supporting yoke is a U-shaped switch support bracket having a base 43, side walls 44 and attaching flanges 45 connected to the cross piece 31 by bolts 46. Freely rotatably supported in a hole in the base 43 is a shouldered stud 47 that is slotted on its upper side to fixedly receive and hold the switch operating vane or plate 48. The stud 47 is centered under the extension tube 42.

The top of the steering column 25 carires a handle bar in the form of cross bar 50 with handle grips 51 on its ends. A control rod 52 extends coaxially through the steering column from a boss 53 on a double ended control lever 53A at the top of the handle bar to within the lower end of the extension tube 42. The lower end of control is nonrotatably connected to a centering part or plug 54 having an axially slotted stud 55 projecting from the lower end of the spindle. When the steering column and control rod are in place in the spindle as shown in FIGS. 6 and 7, the upper edge of the vane or plate 48 is received in the slot in the stud 55. Pressure on either arm 56 or 57 of the control lever 53A thus rotates the control rod and the plate 48. The arms of the lever 53A are conveniently positioned to be pressed by the thumbs of the operator while grasping the handle grips 51 on the handle bar.

One side wall 44 of the bracket 43 supports a pair of vertically spaced switches 58 and 59 having actuating push buttons 60 projecting through the side wall to be engaged and actuated by the plate 48 to close the switches. The push button of the upper switch 59 projects inwardly further than the push button of the lower switch so the upper switch closes first and the control lever must be actuated further to close the switch 58. This provides speed control as will be described.

The other side wall 44 supports a switch 61 with a push button 62 that is actuated by opposite operation of the control lever 53. This switch actuates a warning device as will be described. The forward edge of the base 43 of the switch bracket supports an overload circuit breaker or fuse mounting 64 with suitable connector terminals.

The drive or power mechanism of the vehicle consists of a relatively high speed electric motor 65 positioned transversely over the top of the drive wheel 20 and having its ends supported by plates or brackets 66 and 67 secured to the arms 29 and 30 respectively of the wheel yoke. The shaft of the motor extends through bracket plate 67 and carries a sprocket 68 that drives a toothed belt 69 of rubber or other flexible material. The belt extends rearwardly to a larger sprocket 70 on the jack shaft 71 that is carried by a suitable bearing 72 mounted on the rear of plate 67. The shaft 71 carries a small sprocket 73 that drives a pin and link or bicycle type of chain 74 extending forwardly to a large sprocket 75 secured to the side of the drive wheel 20. A substantial speed reduction between the motor and the drive wheel is thus obtained, the higher speed portion of which is through the toothed rubber belt to decrease noise of operation.

The electrical circuit is shown in FIG. 12 in which the battery 16 which is mounted in the well in the platform on the holder plate 13 is grounded to the frame of the vehicle at 76. The ungrounded or live conductor 77 extends first to one side of a key operated switch 78 and then on to a female plug 79 adapted to receive a male plug connected to a source of charging current (not illustrated). The other side of plug 79 is grounded to the frame at 80. From the key operated switch 78 a conductor 81 extends to one side of the overload relay or fuse 64. From the relay, one conductor 82 extends to a resistor 83 from which conductor 84 extends to the upper switch 59. From switch 58 conductor 85 extends to the motor 65 that is grounded on its opposite side at 86 to the yoke. Closing switch 78 with the correct key and pressing arm 57 of the control level part way towards the handle bar energizes the motor through the resistor for slow speed operation.

Another conductor 87 extends from the over-load relay or circuit breaker 64 directly to switch 58 which is connected on its other side to the conductor 85 and the motor. Thus pressing the control lever 57 all the way toward the handle bar completes a direct, full voltage, circuit to the motor for high speed operation of the vehicle. Conductor 88 from the circuit breaker extends to switch 61 which may be closed by pressing arm 56 of the control lever. This energizes conductor 89 that is connected to the horn 90 or other warning device. The horn is grounded at 91. Grounding conductor 91A connects the yoke of the driving wheel with the frame of the vehicle as the yoke may be insulated from the frame by bushing 36. It will be noted that a source of charging current may be connected to the socket 79 to charge the battery without operating the key operated switch 78.

The flat cross member 17 of the frame has an upstanding bracket 92 secured to its center with a grommet 93 in its upright portion to retain and guide the wires which form the conductors between various parts of the wiring circuit. The upper end of the bracket 92 projects forwardly at 94 for coaction with a cover latch to be described. A second bracket or clamp 95 on the side of the yoke supports the resistor 83. The key operated switch projects upwardly through the front portion 96 of a housing that encloses the motor and the switch assembly. The switch is secured to the cover or housing by a lock nut 97. The charger receptacle or fixture 79 also projects through the housing and is secured in place by suitable screws or rivets. The lower edge of the front housing portion 96 is shaped to be supported on the frame portions 2A and 3. A rear portion 98 of the housing overlies the front part of the platform and encloses the battery 16. A latch 99 on the rear portion is releasably engageable with the forward projecting portion 94 of the bracket 92 to removably hold the rear section of the housing in close joined relation to the front portion 96 along the molded meeting edges 100 and 101. The front portion 96 of the housing is secured to the frame by being screwed to brackets 96A secured to the vehicle frame.

The basic vehicle thus far described and shown in FIG. 2 is well adapted to have auxiliary fixtures attached thereto as illustrated in FIG. 1. For example, the front cross bar 3 of the frame not only acts as a bumper to protect the housing 96 but may receive the curved connecting strip 102 secured by screws threaded into the cross bar. The strip has upwardly divergent rods 103 that extend to horizontal rearwardly turned support sections 104 and downwardly and inwardly converged sections 105 connected to a split clamp ring 106. The ring clamps around the bearing sleeve 26 below the collar 40. The horizontal portions are secured to and support a horizontal platform 107 with front and rear flanges 108 that will support an article basket 109 or other materials.

A paper or article carrying box 110 may be clamped to the steering column 25 by a half round clamp 111 bolted to the front wall of the box. The box has a cover 112 that is inclined due to the inclination of the steering column and this forms a convenient writing surface or small desk for use by the operator.

The seat 113, when used, is mounted on a hollow column 114 of rectangular cross section having out-turned flanges 115 at the bottom that are bolted to the platform 8 of the vehicle. The hollow column may have a carrying basket 116 attached to its rear wall.

What is claimed is:

1. In a vehicle for transporting a single individual in plants and offices and having a platform with spaced wheels at the rear corners thereof,
    a frame extending along the sides of said platform then in upwardly and forwardly converging relation to a front cross bar,
    an inverted U-shaped bracket secured to said forwardly converging portions in upwardly projecting position and having a cross piece inclined downwardly and rearwardly above and to the front of said platform,
    a bearing sleeve member secured to said cross piece and projecting thereabove in rearwardly inclined perpendicular position relative thereto,
    a steerable driving wheel mounted on a yoke having a hollow spindle projecting upwardly therefrom in rotatably guided relation in said sleeve,
    an electric motor and speed reducing means mounted on said yoke and drivingly connected to said driving wheel,
    thrust bearing means around said spindle between said yoke and said cross piece,
    a tubular steering column projecting toward the top of said sleeve member and having axially abutting and rotary driving engagement with the end of said spindle,
    a tubular extension and guide fixedly secured in and projecting from the lower end of said column,
    a retaining collar removably positioned around the upper end of said spindle in thrust relation to the end of said sleeve,
    a headed retaining screw in said collar having its inner end in axial retaining engagement with said spindle and passing through a hole in the spindle into retaining engagement with said extension,
    a fixed collar on the upper end of said sleeve surrounding said retaining collar,
    said fixed collar having a segmental opening therein receiving the head of said screw and limiting rotation of said column and said spindle and yoke,
    a handle bar mounted in crossed relation on the top of said column,
    a double armed lever pivotally mounted on the top of said column with its arms extending along said crossbar,
    a control rod connected to said lever to be rotated thereby and extending downwardly through said column and spindle to below said cross piece on said frame,
    a U-shaped switch support bracket secured to said yoke and having side walls and a base located under said spindle,
    a switch plate pivotally supported on said base concentrically with said control rod,
    means in the form of a slot in the end of said rod releasably and rotatively drivingly engaged with the upper edge of said switch plate,
    first and second switches mounted on one side wall and having actuating members positioned in the path of swinging motion of said switch plate,
    the actuating member of the first of said switches projecting further than the actuating member of the other to be engaged before the other,
    a third switch on the other of said side walls and having an actuating member arranged to be engaged by opposite swinging motion of said switch plate,
    a warning signal mounted on said frame,
    a resistor mount on said yoke,
    said platform having a battery holder mounted in the forward portion of the platform,
    a front cover mounted over said driving wheel and supported on said upwardly converging portions and front cross bar of said frame,
    a bracket on said cross piece supporting the upper rear edge of said front cover,
    a rear cover mounted over said battery and having its front edge abutting the rear edge of said front cover,
    a latch on said rear cover releasably engageable with said last bracket,
    a key operated switch mounted on said front cover,
    a female receptacle connector mounted on said front cover,
    and wiring within said cover adapted to connect a battery located in said battery holder selectively through said key operated switch and said resistor and said first switch to said motor and from said key operated switch through said second switch directly to said motor or from said key operated switch through said third switch to said warning signal,
    said charging connector being connected to said wiring to charge said battery.

2. In a vehicle for transporting a single individual in plants and offices and having a platform with spaced wheels at the rear corners thereof,
    a frame extending along the sides of said platform then in upward relation to a front cross bar,
    an inverted U-shaped bracket secured to said upwardly projecting portions in upwardly projecting position and having a cross piece inclined downwardly and rearwardly above and toward the front of said platform,
    a bearing sleeve member secured to said cross piece and projecting thereabove in rearwardly inclined perpendicular position relative thereto,
    a steerable driving mounted on a yoke having a hollow spindle projecting upwardly therefrom in rotatably guided relation in said sleeve,
    an electric motor and speed reducing means mounted on said yoke and drivingly connected to said driving wheel,
    thrust bearing means around said spindle between said yoke and said cross piece,
    a tubular steering column projecting toward the top of said sleeve member and having rotary driving connection with the end of said spindle,
    a tubular extension and guide fixedly secured in and projecting from the lower end of said column, a retaining collar removably positioned around the upper end of said spindle in thrust relation to the end of said sleeve, a headed retaining screw in said collar having its inner end in axial retaining engagement with said spindle, a fixed collar on the upper end of said sleeve surrounding said retaining collar, said fixed collar having a segmental opening therein receiving the head of said screw and limiting rotation of said column and said spindle and yoke, a handle bar mounted in crossed relation on the top of said column, a double armed lever pivotally mounted on the top of said column with its arms extending along said cross bar, a control rod connected to said lever to be rotated thereby and extending downwardly through said column and spindle to below said cross piece on said frame, a switch support bracket secured to said yoke and having side walls and a base located under said spindle, a switch plate pivotally supported on said base concentrically with said control rod, means on the end of said rod axially releasably and rotatively drivingly engaged with the upper edge of said switch plate, first and second switches mounted on one side wall and having actuating members positioned in the path of swinging motion of said switch plate, the actuating member of the first of said switches projecting further than the actuating member of the other to be engaged before the other, a third switch on the other of said side walls and having an actuating member arranged to be engaged by opposite swinging motion of said switch plate, a warning signal mounted on said frame, a resistor carried by said frame, said platform having a battery holder mounted in the forward portion of the platform, a front cover mounted over said driving wheel and supported on said upwardly extending portions and front cross bar of said frame, a bracket on said cross piece, a rear cover mounted over said battery and having its front edge abutting the rear edge of said front cover, a latch on said rear cover releasably engageable with said last bracket, a key operated switch mounted on said front cover, a female receptacle connector mounted on said front cover, and wiring within said cover adapted to connect a battery located in said battery holder selectively through said key operated switch and said resistor and said first switch to said motor and from said key operated switch through said second switch directly to said motor or from said key operated switch through said third switch to said warning signal, said charging connector being connected to said wiring to charge said battery.

3. In a vehicle for single person transport and having a passenger platform with laterally spaced rear wheels, a frame to which said wheels are connected and extending forwardly of said platform, an inverted U-shaped cross piece extending transversely between side portions of said frame forwardly of said platform, a bearing sleeve connected in upwardly and rearwardly inclined position in the mid-section of said cross piece and opening therethrough, a yoke having a hollow spindle projecting from its top and rotatably received in said sleeve, means axially retaining said spindle in said sleeve, a steerable drive wheel mounted within said yoke, an electric motor with drive connections to said wheel mounted on said yoke, an upwardly facing U-shaped bracket with a cross wall and side walls connected to said yoke above said drive wheel and below said spindle, a switch operating plate having a rotatable support on said cross wall coaxial with said spindle, first and second switches mounted on one of said side walls and having actuating members positioned in the path of swinging motion of said switch plate, the actuating member of the first switch being located to be engaged and actuated first, a third switch mounted on the other of said side walls and having an actuating member positioned in the path of opposite swinging motion of said switch plate, a steering column removably connected to said spindle and projecting thereabove, a handle bar on said column, a control lever pivoted on said handle bar and having a control rod connected thereto and extending downwardly through said column and said spindle, means in the form of a slot formed in the lower end of said control rod receiving the upper edge of said switch plate to rotatably oscillate said switch plate by said rod, a resistor and a warning signal mounted on said yoke, means for supporting a battery on said frame at the forward end of said platform, and wiring adapted to be connected to a battery on said battery supporting means and connected to said switches to selectively connect said battery to said motor through said first switch and said resistor to said motor and through said second switch directly to said motor or to said warning signal through said third switch.

4. In a vehicle for signal person transport and having a passager platform with laterally spaced rear wheels, a frame to which said wheels are connected and extending forwardly of said platform, an inverted U-shaped cross piece extending transversely between side portions of said frame forwardly of said platform, a bearing sleeve connected in upwardly and rearwardly inclined position in the mid-section of said cross piece and opening therethrough, a yoke having a hollow spindle projecting from its top and rotatably received in said sleeve, means axially retaining said spindle in said sleeve, a steerable drive wheel mounted within said yoke, an electric motor with drive connections to said wheel mounted on said yoke, a first bracket with a cross wall and side walls connected to said yoke above said drive wheel and below said spindle, a switch operating plate having a rotatable support on said cross wall coaxial with said spindle, first and second switches mounted on one of said side walls and having actuating members positioned in the path of swinging motion of said switch plate, the actuating member of the first switch being located to be engaged and actuated first, a third switch mounted on the other of said side walls and having an actuating member positioned in the path of opposite swinging motion of said switch plate, a steering column removably connected to said spindle and projecting thereabove, a handle bar on said column, a control lever pivoted on said handle bar and having a control rod connected thereto and extending downwardly through said column and said spindle, means in the form of a slot formed in the lower end of said control rod receiving the upper edge of said switch plate to rotatably oscillate said switch plate by said rod, a resistor and a warning signal carried by said frame, means for supporting a battery on said frame at the forward end of said platform, and wiring adapted to be connected to a battery on said battery supporting means and connected to said switches to selectively connect said battery to said motor through said first switch and said resistor to said motor and through said second switch directly to said motor or to said warning signal through said third switch.

5. In a vehicle having a passenger platform with laterally spaced rear wheels, a frame to which said wheels are connected and extending forwardly of said platform, an inverted U-shaped cross piece extending transversely between side portions of said frame forwardly of said platform, a bearing sleeve connected in upwardly and rearwardly inclined position in the mid-section of said cross piece and opening therethrough, a yoke having a hollow spindle projecting from its top and rotatably received in said sleeve, means axially retaining said spindle in said sleeve, a steerable drive wheel mounted within said yoke, an electric motor with drive connections to said wheel mounted on said yoke, means forming a cross wall and side walls connected to said yoke above said drive wheel and below said spindle, a switch operating plate having a rotatable support on said cross wall coaxial with said spindle, first and second switches mounted on one of said side walls and having actuating members positioned in the path of swinging motion of said switch plate, the actuating member of the first switch being located to be engaged and actuated first, a third switch mounted on the other of said side walls and having an actuating member positioned in the path of opposite swinging motion of said switch plate, a steering column connected to said spindle and projecting thereabove, a handle bar on said column, a control lever pivoted on said handle bar and having a control rod connected thereto and extending downwardly through said column and said spindle, means connecting the lower end of said control rod to said switch plate to rotatably oscillate said switch plate by said rod, a resistor and a warning signal carried by said yoke, means for supporting a battery on said frame at the forward end of said platform, and wiring adapted to be connected to a battery on said battery supporting means and connected to said switches to selectively connect said battery to said motor through said first switch and said resistor to said motor and through said second switch directly to said motor or to said warning signal through said third switch.

6. In a vehicle having a passenger platform with laterally spaced rear wheels, a frame to which said wheels are connected and extending forwardly of said platform, an inverted U-shaped cross piece extending transversely between side portions of said frame forwardly of said platform, a bearing sleeve connected in upwardly and rearwardly inclined position in the mid-section of said cross piece and opening therethrough, a wheel support member having a hollow spindle projecting from its top and rotatably received in said sleeve, means axially retaining said spindle in said sleeve, a steerable drive wheel mounted within said support member, an electric motor with drive connections to said wheel mounted on said wheel supporting member, means forming a cross wall connected to said wheel supporting member above said drive wheel and below said spindle, a switch operating plate having a rotatable support on said cross wall coaxial with said spindle, first and second switches mounted on one side of said plate and having actuating members positioned in the path of swinging motion of said switch plate, the actuating member of the first switch being located to be engaged and actuated first, a third switch mounted on the other side of said plate and having an actuating member positioned in the path of opposite swinging motion of said switch plate, a steering column connected to said spindle and projecting thereabove, a handle bar on said column, a control lever pivoted on said handle bar and having a control rod connected thereto and extending downwardly through said column and said spindle, means connecting the lower end of said control rod to said switch plate to rotatably oscillate said switch plate by said rod, a resistor and a warning signal carried by said frame, means for supporting a battery on said frame at the forward end of said platform, and wiring adapted to be connected to a battery on said battery supporting means and connected to said switches to selectively connect said battery to said motor through said first switch and said resistor to said motor and through said second switch directly to said motor or to said warning signal through said third switch.

7. In a vehicle for single person transport and having a passenger platform with spaced side wheels at the back, a frame to which said platform and wheels are connected and having spaced side members projecting forwardly from said platform and connected by a front cross bar, a downwardly facing U-shaped member having its ends secured to the forwardly projecting portions of said side members with a flat cross piece inclined downwardly and rearwardly, a bearing sleeve mounted on said cross piece in rearwardly and upwardly inclined position, a yoke having an upwardly projecting hollow spindle rotatably received in said sleeve and projecting axially therebeyond, a spindle retaining collar engaged with said spindle and in thrust transmitting relation to the top of said sleeve, means securing said collar to said spindle and having rotation limiting engagement with said sleeve, a hollow steering column arranged in coaxially extending and removable relation to the end of said spindle, means providing rotatively interlocked connection between said column and said spindle, means in telescoping aligning relation to said spindle and column members, a steerable driving wheel mounted on said yoke, an electric motor mounted on said yoke, control switches mounted on said yoke, a switch operating member pivotally mounted on a cross member between the arms of said yoke and swingable about an axis aligned with said spindle into coacting actuating relation to said switches, driving connections between said motor and said driving wheel, a control rod rotatably mounted in said column, means on the lower end of said rod axially removably and rotatively drivingly engageable with said switch operating member, a steering control member on the upper end of said column, a motor control member on said steering control member operatively connected to said control rod, and wiring between said motor and said switches and adapted to be connected to a battery on said platform for selectively connecting said motor to said battery.

8. In a vehicle having a passenger platform with spaced side wheels at the back, a frame to which said platform and wheels are connected and having spaced side members projecting forwardly from said platform and connected by a front cross bar, a downwardly facing U-shaped member with a crosspiece having its ends secured to the forwardly projecting portions of said side members, a bearing sleeve mounted on said cross piece in rearwardly and upwardly inclined position, a yoke having an upwardly projecting hollow spindle rotatably received in said sleeve, means engaged with said spindle and in thrust transmitting relation with said sleeve, said thrust transmitting means having rotation limiting engagement with said sleeve, a hollow steering column arranged in coaxially extending and removable relation to the end of said spindle, means providing rotatively interlocked connection between said column and said spindle, means in telescoping aligning relation to said spindle and column members, a steerable driving wheel mounted on said yoke, an electric motor mounted on said yoke, control switches mounted on said yoke, a switch operating member pivotally mounted about an axis aligned with said spindle for movement into coacting actuating relation to said switches, driving connections between said motor and said driving wheel, a control rod rotatably mounted in said column, means on the lower end of said rod axially removably and rotatively drivingly engageable with said switch operating member, a steering control member on the upper end of said column, a motor control member on said steering control member operatively connected to said control rod, and wiring between said motor and said switches and adapted to be connected to a battery on said platform for selectively connecting said motor to said battery.

9. In a vehicle having a passenger platform with spaced side wheels at the back, a frame to which said platform is connected and having spaced side members projecting forwardly from said platform and connected by a front cross bar, a downwardly facing U-shaped member with a cross piece and having its ends secured to the forwardly projecting portions of said side members, a bearing sleeve mounted on said cross piece in rearwardly and upwardly inclined position, a wheel support member having an upwardly projecting hollow spindle rotatably received in said sleeve, means engaged with said spindle and in thrust transmitting relation with the top of said sleeve, a hollow steering column arranged in coaxially extending and removable relation to the end of said spindle, means providing rotatively interlocked connection between said column and said spindle, means in telescoping aligning relation to said spindle and column members, a steerable driving wheel mounted on said wheel support member, an electric motor mounted on said wheel support member, control switches mounted on said wheel support member, a switch operating member pivotally mounted about an axis aligned with said spindle for movement into coacting actuating relation to said switches, driving connections between said motor and said driving wheel, a control rod rotatably mounted in said column, means on the lower end of said rod axially removably and rotatively drivingly engageable with said switch operating member, a steering control member on the upper end of said column, a motor control member on said steering control member operatively connected to said control rod, and wiring between said motor and said switches and adapted to be connected to a battery on said platform for selectively connecting said motor to said battery.

References Cited by the Examiner

UNITED STATES PATENTS

| 2,468,801 | 5/1949 | Beall | 180—26 |
| 2,630,186 | 3/1953 | Joy | 180—26 |
| 3,099,326 | 7/1963 | Weigel et al. | 180—26 |
| 3,213,957 | 10/1965 | Wrigley | 180—26 |
| 3,224,524 | 12/1965 | Laher | 180—26 |

FOREIGN PATENTS 1,005,998  1/1952  France.

KENNETH H. BETTS, *Primary Examiner.*